United States Patent
Shin et al.

(10) Patent No.: US 10,857,898 B2
(45) Date of Patent: Dec. 8, 2020

(54) CHARGING SYSTEM AND METHOD FOR VEHICLE

(71) Applicants: HYUNDAI MOTOR COMPANY, Seoul (KR); KIA MOTORS CORPORATION, Seoul (KR)

(72) Inventors: Ho Joon Shin, Suwon-Si (KR); Joo Young Park, Yongin-si (KR); Yong Jae Lee, Hwaseong-Si (KR); Sung Kyu Kim, Bucheon-si (KR); Su Hyun Bae, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 70 days.

(21) Appl. No.: 16/168,295

(22) Filed: Oct. 23, 2018

(65) Prior Publication Data
US 2019/0315234 A1    Oct. 17, 2019

(30) Foreign Application Priority Data
Apr. 13, 2018  (KR) .......................... 10-2018-0043152

(51) Int. Cl.
*H02J 7/00*    (2006.01)
*B60L 53/24*    (2019.01)
*B60L 53/10*    (2019.01)

(52) U.S. Cl.
CPC .............. *B60L 53/24* (2019.02); *B60L 53/11* (2019.02); *H02J 7/007184* (2020.01); *B60L 2210/30* (2013.01); *B60L 2240/547* (2013.01); *B60L 2240/549* (2013.01)

(58) Field of Classification Search
USPC ......................................................... 320/109
See application file for complete search history.

(56) References Cited

U.S. PATENT DOCUMENTS

| 2014/0217973 | A1* | 8/2014 | Lee | B60L 11/1814 320/109 |
| 2014/0368170 | A1* | 12/2014 | Tang | B60L 53/24 320/137 |
| 2018/0251036 | A1* | 9/2018 | Tapadia | H02M 3/158 |

FOREIGN PATENT DOCUMENTS

KR    10-2012-0047100 A    5/2012

* cited by examiner

*Primary Examiner* — Eric D Lee
(74) *Attorney, Agent, or Firm* — Morgan, Lewis & Bockius LLP (57) ABSTRACT

A charging system for a vehicle includes: a power transmitter transmitting power for charging a battery of a vehicle; a charger including a three-phase motor and inverter, and receiving the power from the power transmitter; an input voltage calculating processor selecting any one of a plurality of predetermined duty ratios and calculating a value of an input voltage supplied to the charger based on the selected duty ratio and a voltage value of the battery of the vehicle; an input current calculating processor calculating a value of an input current based on the calculated value of the input voltage and a value of the power transmitted by the power transmitter; a power transmission controller instructing the calculated input current to be input to the charger; and a charging controller instructing the battery of the vehicle to be charged.

11 Claims, 10 Drawing Sheets

FIG. 1

-PRIOR ART-

FIG. 2

-PRIOR ART-

INTERLEAVED PWM, DUTY RATIO 1/3

FIG. 5

INTERLEAVED PWM, DUTY RATIO 2/3

CHARGING SYSTEM AND METHOD FOR VEHICLE

CROSS REFERENCE TO RELATED APPLICATION

The present application claims priority to Korean Patent Application No. 10-2018-0043152, filed Apr. 13, 2018, the entire contents of which is incorporated herein for all purposes by this reference.

TECHNICAL FIELD

The present disclosure relates to a charging system and method for a vehicle, and more particularly, to a charging system and method capable of reducing current ripple generated during a fast charging process of a battery for a vehicle.

BACKGROUND

Eco-friendly vehicles such as electric vehicles (EVs) or plug-in hybrid electric vehicles (PHEVs) use an electric vehicle supply equipment (EVSE) installed at a charging station to charge a battery.

One of the most important indexes in the EVSE using the conventional motor-inverter is charging efficiency, and one of variables that have the greatest effect on the charging efficiency is ripples of a charging current and a motor current. Since the charging efficiency of a charging system decrease as amplitude of the ripple current increases, the ripple current should be reduced as much as possible.

Figure 1:
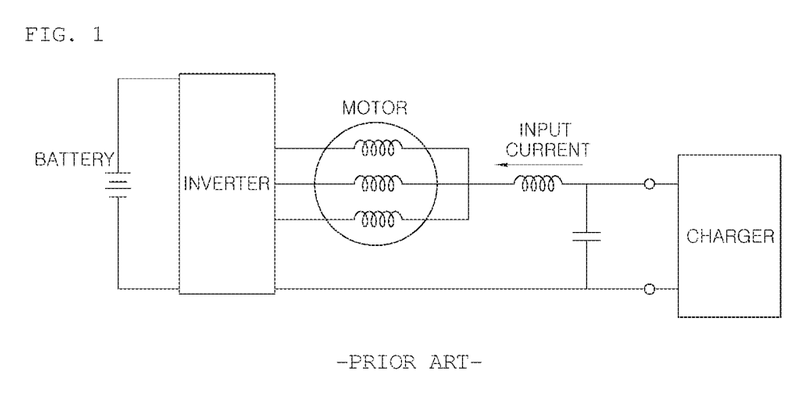
FIG. 1 is a diagram illustrating a configuration of a charging system for a vehicle according to a conventional embodiment.
Figure 2:
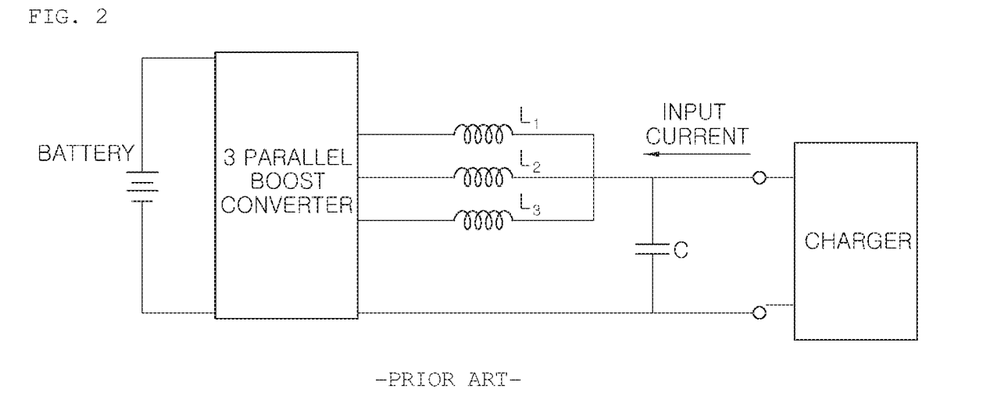
FIG. 2 is a diagram illustrating a configuration of a charging system for a vehicle according to another conventional embodiment.

To this end, according to the related art, as illustrated in FIG. 1, by additionally connecting an inductor Lch to a neutral terminal of the motor, the ripple of the charging current and the motor current was reduced during charging. However, in the method as described above, there is a limitation that cost is increased and a size is increased due to the additional inductor. In addition, as another method, according to the related art, as illustrated in FIG. 2, the ripple of the current was reduced during charging by using three separate inductors and three parallel boost converters together with an interleaved PWM switching scheme. However, unlike the conventional three parallel boost converters using the three separate inductors, a multi-input charging system has a limitation in that a tendency may vary because each phase uses a motor that affects each other.

The contents described as the related art have been provided only to assist in understanding the background of the present disclosure and should not be considered as corresponding to the related art known to those having ordinary skill in the art.

SUMMARY

An object of the present disclosure is to provide a charging system and method for a vehicle capable of reducing a current ripple generated during a fast charging process of the vehicle.

According to an embodiment of the present disclosure, a charging system for a vehicle includes: a power transmitter transmitting power for charging a battery of a vehicle; a charger including a three-phase motor and inverter connected to the three-phase motor, and receiving the power transmitted from the power transmitter to charge the battery of the vehicle; an input voltage calculating processor selecting any one of a plurality of predetermined duty ratios and calculating a value of an input voltage supplied to the charger based on the selected duty ratio and a voltage value of the battery of the vehicle; an input current calculating processor calculating a value of an input current which is input to the charger based on the calculated value of the input voltage and a value of the power transmitted by the power transmitter; a power transmission controller instructing the calculated input current to be input to the charger from the power transmitter; and a charging controller instructing the battery of the vehicle to be charged based on the calculated value of the input voltage and the voltage value of the battery of the vehicle.

The charger may include a first capacitor and a second capacitor which are connected in parallel to the inverter; a second relay connected to a neural terminal of the three-phase motor; and a first relay and a third relay which are connected to the inverter.

The inverter may receive a three-phase signal from the three-phase motor through a plurality of driving elements which are connected to each other.

The power transmitter may include a power generator providing power; and a third capacitor and a fourth capacitor which are connected in parallel to the power generator.

The charging controller may connect the first relay and the third relay to charge the battery of the vehicle, when the calculated value of the input voltage is equal to the voltage value of the battery of the vehicle.

The charging controller may boost the input voltage through the inverter by connecting the second relay and the third relay to thereby charge the battery of the vehicle, when the calculated value of the input voltage is smaller than the voltage value of the battery of the vehicle.

The charging controller may each provide three pulse width modulation (PWM) signals having the selected duty ratio to a plurality of driving elements of the inverter connected to the respected phases of the three-phase motor, when the calculated value of the input voltage is smaller than the voltage value of the battery of the vehicle.

The three PWM signals may each have a phase difference of 120°.

The plurality of predetermined duty ratios may include 0, 1/3, 2/3, and 1.

According to another embodiment of the present disclosure, a fast charging method for a vehicle includes: determining charging power provided from the power transmitter to charge the battery of the vehicle; selecting any one of a plurality of predetermined duty ratios and calculating a value of an input voltage provided to the charger based on the selected duty ratio and a voltage value of the battery of the vehicle; calculating a value of an input current which is input to the charger based on the calculated value of the input voltage and a value of the power provided from the power transmitter; instructing the calculated input current to be input to the charger from the power transmitter; and instructing the battery of the vehicle to be charged based on the calculated value of the input voltage and the voltage value of the battery of the vehicle.

The fast charging method for a vehicle may further include re-calculating the input voltage and the input current and controlling the re-calculated input voltage and input current to be input to the charger, when charged power is changed in a process in which the calculated input voltage and input current are input to the charger from the power transmitter to charge the battery of the vehicle.

DETAILED DESCRIPTION OF THE EMBODIMENTS

Hereinafter, a multi-input charging system and method for an eco-vehicle according to embodiments of the present disclosure will be described with reference to the accompanying drawings.

Figure 3:
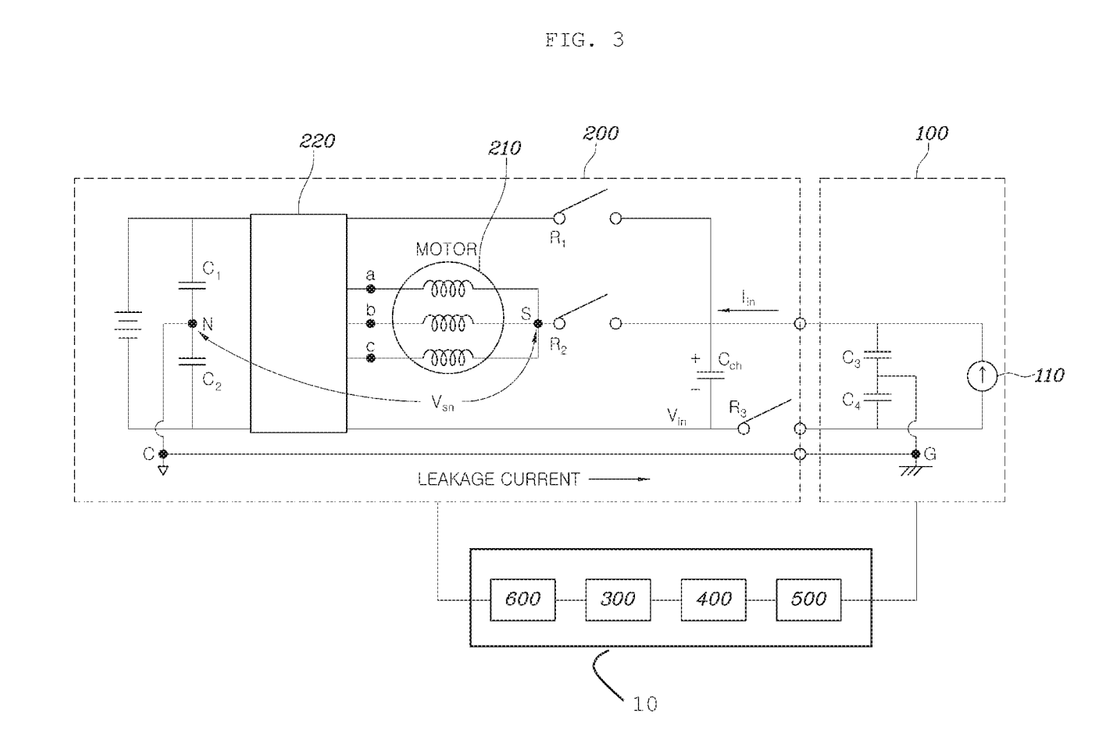
FIG. 3 is a diagram illustrating a configuration of a charging system for a vehicle according to an embodiment of the present disclosure.
Figure 4:
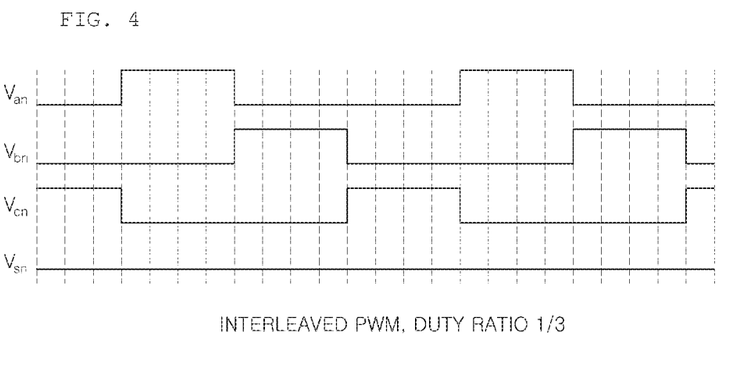
FIG. 4 is a diagram illustrating a pulse width modulation (PWM) signal provided to a driving element of an inverter connected to each of the phases of a three-phase motor, and a common mode voltage accordingly, in the charging system for a vehicle according to an embodiment of the present disclosure.
Figure 5:
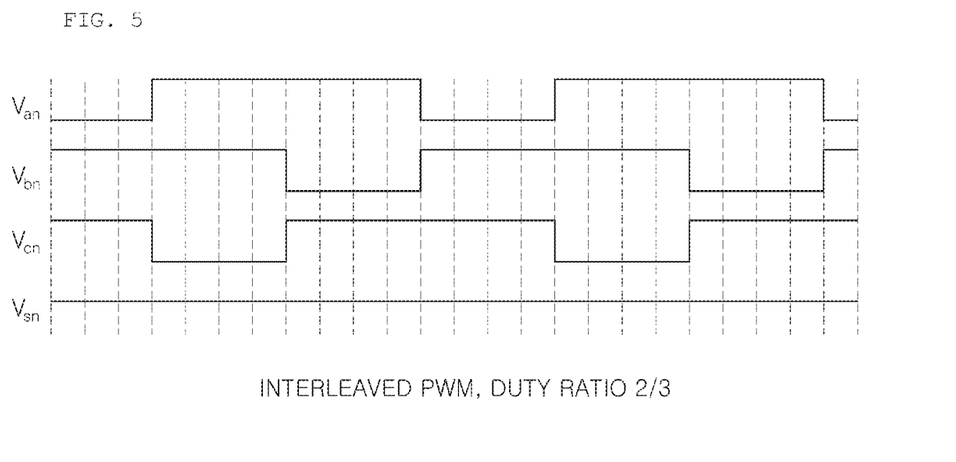
FIG. 5 is a diagram illustrating a PWM signal provided to a driving element of an inverter connected to each of the phases of a three-phase motor, and a common mode voltage accordingly, in the charging system for a vehicle according to another embodiment of the present disclosure.
Figure 6A:
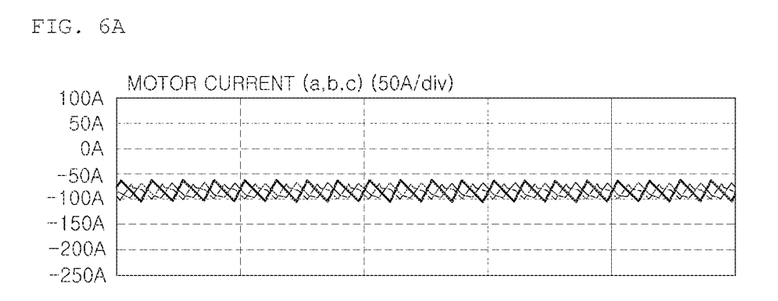
FIGS. 6A-6D are diagrams illustrating simulation result data showing ripples of a motor current, an input current, an input voltage, and a leakage current in a case in which three PWM signals having a duty ratio of 1/3 and each having a phase difference of 120° are provided to an inverter.
Figure 6B:
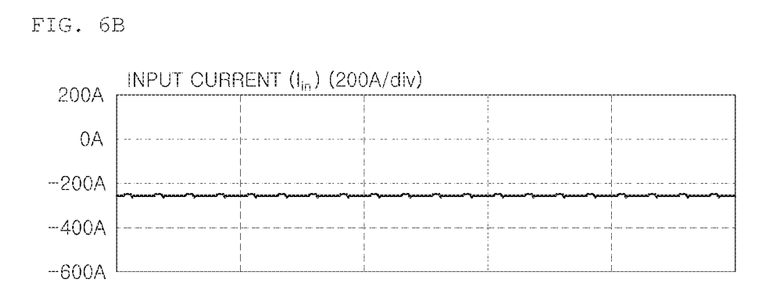
Figure 6C:
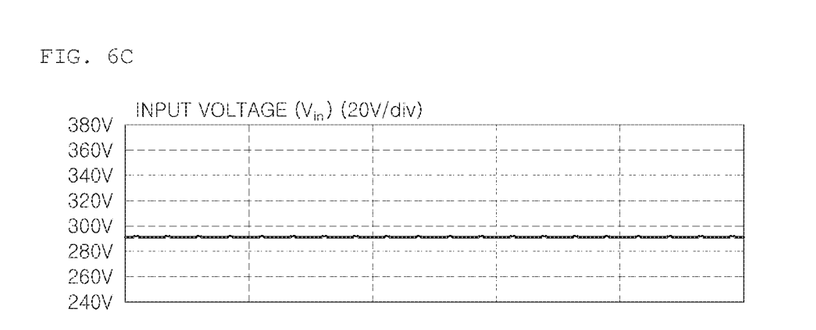
Figure 6D:
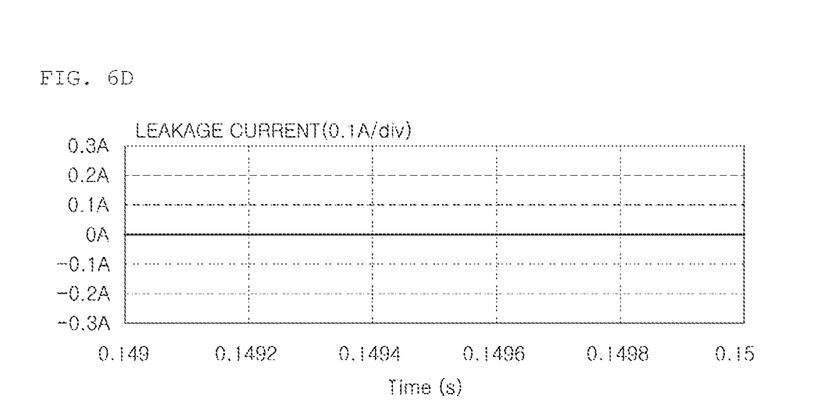
Figure 7A:
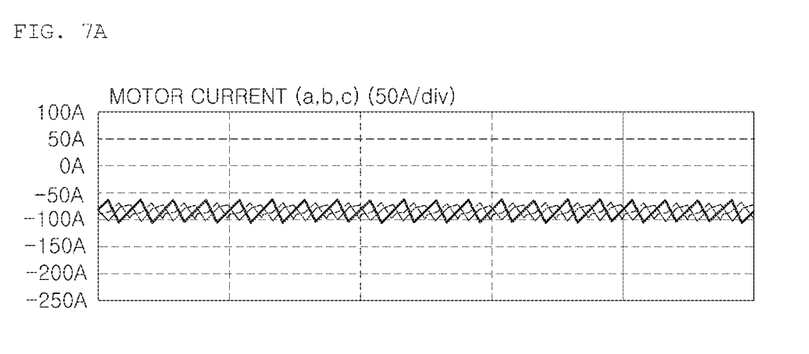
FIGS. 7A-7D are diagrams illustrating simulation result data showing ripples of a motor current, an input current, an input voltage, and a leakage current in a case in which three PWM signals having a duty ratio of 2/3 and each having a phase difference of 120° are provided to an inverter.
Figure 7B:
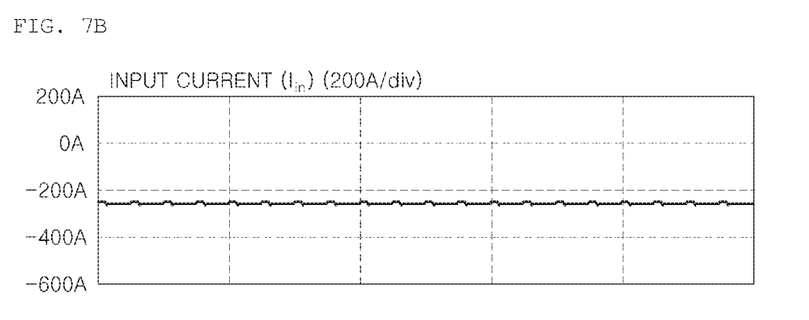
Figure 7C:
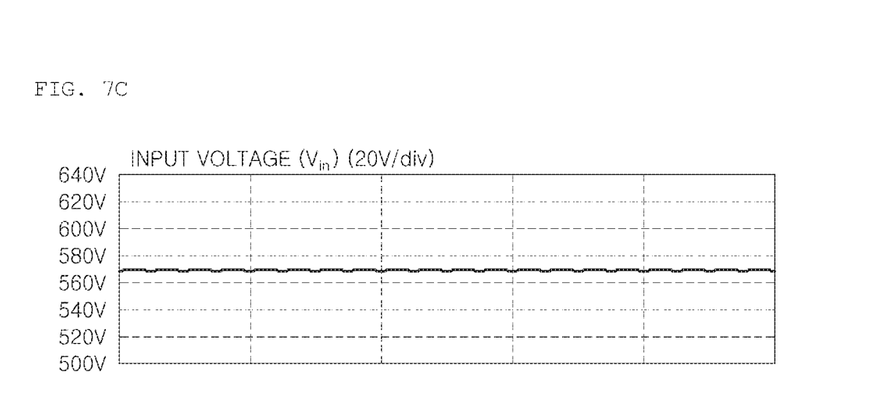
Figure 7D:
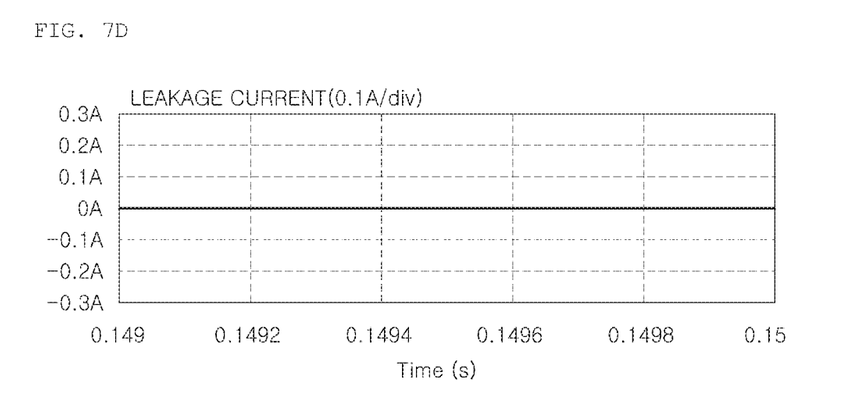

FIG. 3 is a diagram illustrating a configuration of a charging system for a vehicle according to an embodiment of the present disclosure, FIG. 4 is a diagram illustrating a pulse width modulation (PWM) signal provided to a driving element of an inverter connected to each of the phases of a three-phase motor in the charging system for a vehicle according to an embodiment of the present disclosure, FIG. 5 is a diagram illustrating a PWM signal provided to a driving element of an inverter connected to each of the phases of a three-phase motor in the charging system for a vehicle according to another embodiment of the present disclosure, FIGS. 6A-6D are diagrams illustrating simulation result data showing ripples of a motor current, an input current, an input voltage, and a leakage current in a case in which three PWM signals having a duty ratio of 1/3 and each having a phase difference of 120° are provided to an inverter, and FIG. 7 is a diagram illustrating simulation result data showing ripples of a motor current, an input current, and a leakage current in a case in which three PWM signals having a duty ratio of 2/3 and each having a phase difference of 120° are provided to an inverter.

As illustrated in FIG. 3, a charging system for a vehicle according to an embodiment of the present disclosure may include a power transmitter 100, a charger 200, an input voltage calculating processor 300, an input current calculating processor 400, a power transmission controller 500, and a charging controller 600. Here, the input voltage calculating processor 300, the input current calculating processor 400, the power transmission controller 500, and the charging controller 600 are hardware devices to be connected to a processor 10 or embedded therein.

In various embodiments of the present disclosure, the processor 10 is a hardware device and may be a central processing unit (CPU) within a computer that carries out the instructions of a computer program by performing the basic arithmetic, logical control the input/output (I/O) operations specified by the instructions, capable of controlling one or more of the electrical systems in a vehicle. The processor 10 may be an electronic control unit (ECU) or communicate with the ECU installed in the vehicle.

The power transmitter 100 serves to provide power for charging a battery of a vehicle. Specifically, the power transmitter 100 may include a power generator 110 providing the power, and a third capacitor C3 and a fourth capacitor C4 which are connected in parallel to the power generator 110.

The charger 200 is supplied with the power provided from the power transmitter 110 to charge the battery of the vehicle. Specifically, the charger 200 may include a three-phase motor 210, an inverter 220 connected to the three-phase motor 210, a first capacitor C1 connected in parallel to the inverter 220, a second capacitor C2, a second relay R2 connected to a neutral terminal of the three-phase motor 210, and a first relay R1 and a third relay R3 which are connected to the inverter 220, as illustrated in FIG. 3. Here, the inverter 220 may receive a three-phase signal from a three-phase motor 210 through a plurality of driving elements which are connected to each other within the inverter 220. In this case, the three-phase signal may include an input voltage and an input current which are input to each of the phases of the three-phase motor 210. For example, the plurality of driving elements include switching elements (IGBT) which are included in an inverter as well known.

The input voltage calculating processor 300 may select any one of a plurality of predetermined duty ratios. Here, the plurality of predetermined duty ratios may include 0, 1/3, 2/3, and 1. Specifically, the input voltage calculating processor 300 may select a specific duty ratio of the plurality of predetermined duty ratios based on the power provided by the power transmitter 100. For example, in a case in which the battery of the vehicle may be sufficiently charged with only the power provided by the power transmitter 100, the input voltage calculating processor 300 may select a duty ratio of 1 of the plurality of duty ratios. In other words, according to an embodiment, in a case in which the battery of the vehicle is a battery of 800V and the power transmitter 100 may provide sufficient power to charge the battery of 800V, the input voltage calculating processor 300 may select the duty ratio of 1. That is, the above-mentioned case corresponds to a case in which it is not necessary to boost the voltage through the inverter 220.

However, according to an embodiment, in a case in which the battery of the vehicle may not be sufficiently charged with only the power provided by the power transmitter 100, that is, in a case in which it is necessary to boost the voltage through the inverter 220, the input voltage calculating processor 300 may select 1/3 or 2/3, which is a duty ratio smaller than 1.

The input voltage calculating processor 300 may calculate a value of an input voltage provided to the charger through Equation 1 below based on the duty ratio selected according to the above-mentioned method and the voltage value of the battery of the vehicle. For example, in a case in which the selected duty ratio is 1/3 and the battery of the vehicle is a battery of 600V, the value of the input voltage provided to the charger 200 may be 200V according to Equation below.

$$V_{in} = D \times V_{bat} \qquad [\text{Equation 1}]$$

Vin: input voltage, D: duty ratio, Vbat: voltage of battery of vehicle

When the value of the input voltage calculated based on the duty ratio and the voltage value of the battery of the vehicle is equal to the voltage value of the battery of the vehicle, the charging controller 600 may connect the first relay R1 and the third relay R3 to each other to thereby charge the battery of the vehicle. As described above, the above-mentioned case corresponds to a case in which the battery of the vehicle may be sufficiently charged with only the power provided by the power transmitter 100. More specifically, according to an embodiment, in a case in which the battery of the vehicle is a battery of 800V, the selected duty ratio is 1, and the value of the input voltage calculated according to Equation 1 is 800V, the charging controller 600 may connect the power transmitter 100 and the battery of the vehicle in series with each other by connecting the first relay R1 and the third relay R3 to each other to thereby charge the battery of the vehicle.

On the other hand, in a case in which the value of the input voltage calculated based on the duty ratio and the voltage value of the battery of the vehicle is smaller than the voltage value of the battery of the vehicle, the charging controller 600 may boost the corresponding input voltage through the inverter 220 by connecting the second relay R2 and the third relay R3 to each other to thereby charge the battery of the vehicle. As described above, the above-mentioned case corresponds to a case in which the battery of the vehicle may be not sufficiently charged with only the power provided by the power transmitter 100. More specifically, according to an embodiment, in a case in which the battery of the vehicle is a battery of 900V, the selected duty ratio is 1/3, and the value of the input voltage calculated according to Equation 1 is 300V, the charging controller 600 may boost the corresponding input voltage through the inverter 220 by connecting the second relay R2 and the third relay R3 to each other to thereby charge the battery of the vehicle.

When the value of the input voltage calculated based on the duty ratio and the voltage value of the battery of the vehicle is smaller than the voltage value of the battery of the vehicle, the charging controller 600 may each provide three PWM signals having the duty ratio selected at the time of calculating the value of the corresponding input voltage to a plurality of driving elements within the inverter 220 which are connected to the respective phases of the three-phase motor 210. In this case, the three PWM signals each provided to the plurality of driving elements within the inverter 220 may have a selected specific duty ratio and may each have a phase difference of 120°, as illustrated in FIGS. 4 and 5.

In addition, in a case in which the value of the calculated input voltage is smaller than the voltage value of the battery of the vehicle, the duty ratio selected by the charging controller 600 may be 1/3 or 2/3. That is, in the case in which the value of the calculated input voltage is smaller than the voltage value of the battery of the vehicle, the charging controller 600 may provide the three PWM signals having the duty ratio of 1/3 or 2/3 and each having the phase difference of 120° to the inverter 220. In this case, the reason why the charging controller 600 selects the duty ratio of 1/3 or 2/3 will be described below in more detail.

The input current calculating processor 400 may calculate a value of an input current which is input to the charger 200 based on the value of the calculated input voltage and the value of the power provided by the power transmitter 100 after calculating the value of the input voltage, and the power transmission controller 500 may input the calculated input current to the charger 200 from the power transmitter 100. Here, the input current calculating processor 400 may calculate the value of the input current through Equation 2 below.

$$Iin = P/Vin \qquad \text{[Equation 2]}$$

Iin: input current, P: power provided by power transmitter, Vin: input voltage

Referring to FIG. 3, in the charging system for a vehicle according to the present disclosure, in a case in which the power transmitter 100 and the charger 200 are connected to each other to charge the battery of the vehicle, a leakage current that reduces efficiency of the charging system may be generated. Here, the cause of the leakage current is related to a frequency and amplitude of a common mode voltage Vsn, and when the frequency of the common mode voltage Vsn is 0, the leakage current is not generated. That is, in order to block the generation of the leakage, it is necessary to make a variation of the common mode voltage Vsn close to 0. Here, the common mode voltage Vsn, which is a voltage between nodes (S and n), may be a voltage between a neutral terminal of the three-phase motor 210 and a virtual neutral terminal of a direct current terminal of the inverter 220.

More specifically, referring to FIGS. 4 to 7, in a case in which the three PWM signals having the duty ratio of 1/3 and each having the phase difference of 120° are provided to the inverter 220, or the three PWM signals having the duty ratio of 2/3 and each having the phase difference of 120° are provided to the inverter 220, the common mode voltage Vsn may be maintained at a single value. That is, the frequency of the common mode voltage Vsn is close to 0, thereby making it possible to block the generation of the leakage current during charging of battery of the vehicle. As a result, the efficiency of the charging system may be further improved.

Further, referring to FIGS. 6 and 7, the input current Vin, the motor current, and the leakage current may be all reduced by providing the three PWM signals having the duty ratio of 1/3 or 2/3 and each having the phase difference of 120° to the inverter. As a result, the efficiency of the charging system may be improved.

In other words, according to the present disclosure, in the case in which the battery of the vehicle may not be sufficiently charged with only the power provided by the power transmitter 100, the charging controller 600 charges the battery of the vehicle through the boosting process using the inverter by connecting the second relay R2 and the third relay R3 to each other. In this case, the charging controller 600 may charge the battery of the vehicle by boosting the input voltage by providing the three PWM signals having the duty ratio of 1/3 or 2/3 and each having the phase difference of 120° to the inverter 220 according to the value of the power provided by the power transmitter 100, and may reduce all the input current Vin, the motor current, and the leakage current during the charging process. As a result, efficiency and stability of the charging system may be further improved.

Figure 8:
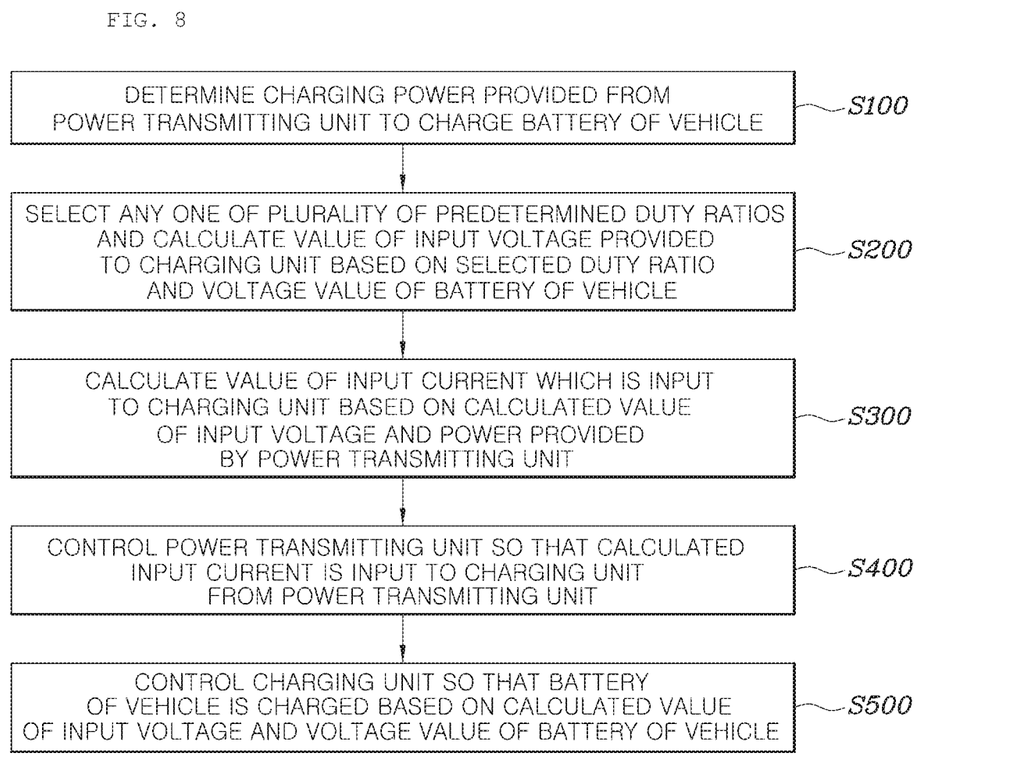
FIG. 8 is a flowchart illustrating a flow of a fast charging method for a vehicle according to an embodiment of the present disclosure.

FIG. 8 is a flowchart illustrating a flow of a fast charging method for a vehicle according to an embodiment of the present disclosure. As illustrated in FIG. 8, a fast charging method for a vehicle may include determining charging power provided from the power transmitter to charge the battery of the vehicle; selecting any one of a plurality of predetermined duty ratios and calculating a value of an input voltage provided to the charger based on the selected duty ratio and a voltage value of the battery of the vehicle;

calculating a value of an input current which is input to the charger based on the calculated value of the input voltage and a value of the power provided from the power transmitter; and instructing the calculated input current to be input to the charger from the power transmitter; and instructing the battery of the vehicle to be charged based on the calculated value of the input voltage and the voltage value of the battery of the vehicle.

In addition, the fast charging method for a vehicle may further include re-calculating the input voltage and the input current and controlling the re-calculated input voltage and input current to be input to the charger, in a case in which charged power is changed in a process in which the calculated input voltage and input current are input to the charger from the power transmitter to charge the battery of the vehicle.

Since detailed technical characteristics in the respective operations of the fast charging method for a vehicle are the same as those of the charging system for a vehicle, a detailed description thereof will be omitted.

As described above, according to the present disclosure, the ripple current generated during the fast charging process of the battery of the vehicle may be reduced, thereby making it possible to further improve the charging efficiency of the charging system.

In addition, the use of the elements such as the inductor, the capacitor, and the like is minimized, thereby making it possible to reduce the cost.

Further, the leakage current is reduced in the fast charging process of the battery of the vehicle, thereby making it possible to improve stability of the charging system.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A charging system for a vehicle, comprising:
   a power transmitter transmitting power for charging a battery of a vehicle;
   a charger including a three-phase motor and an inverter connected to the three-phase motor, and receiving the power transmitted from the power transmitter to charge the battery of the vehicle;
   an input voltage calculating processor selecting one of a plurality of predetermined duty ratios based on the power provided by the power transmitter and calculating a value of an input voltage transmitted to the charger based on the selected duty ratio and a voltage value of the battery of the vehicle;
   an input current calculating processor calculating a value of an input current which is inputted to the charger based on the calculated value of the input voltage and a value of the power from the power transmitter;
   a power transmission controller instructing the calculated input current to be input to the charger from the power transmitter; and
   a charging controller instructing the battery of the vehicle to be charged based on the calculated value of the input voltage and the voltage value of the battery of the vehicle.

2. The charging system of claim 1, wherein the charger includes:
   a first capacitor and a second capacitor which are connected in parallel to the inverter;
   a first relay connected to the inverter;
   a second relay connected to a neutral terminal of the three-phase motor; and
   a third relay connected to the inverter.

3. The charging system of claim 2, wherein the charging controller connects the first relay and the third relay to charge the battery of the vehicle, when the calculated value of the input voltage is equal to the voltage value of the battery of the vehicle.

4. The charging system of claim 2, wherein the charging controller boosts the input voltage through the inverter by connecting the second relay and the third relay to thereby charge the battery of the vehicle, when the calculated value of the input voltage is smaller than the voltage value of the battery of the vehicle.

5. The charging system of claim 1, wherein the inverter receives a three-phase signal from the three-phase motor through a plurality of driving elements which are connected to each other.

6. The charging system of claim 1, wherein the power transmitter includes:
   a power generator generating the power; and
   a third capacitor and a fourth capacitor which are connected in parallel to the power generator.

7. The charging system of claim 1, wherein the charging controller provides three pulse width modulation (PWM) signals having the selected duty ratio to a plurality of driving elements of the inverter connected to the respected phases of the three-phase motor, when the calculated value of the input voltage is smaller than the voltage value of the battery of the vehicle.

8. The charging system of claim 7, wherein each of the three PWM signals has a phase difference of 120°.

9. The charging system of claim 1, wherein the plurality of predetermined duty ratios include 0, 1/3, 2/3, and 1.

10. A fast charging method for a vehicle of claim 1, comprising:
    determining, by a processor, charging power transmitted from a power transmitter to charge a battery of the vehicle;
    selecting, by the processor, one of a plurality of predetermined duty ratios and calculating a value of an input voltage transmitted to a charger based on the selected duty ratio and a voltage value of the battery of the vehicle;
    calculating, by the processor, a value of an input current which is input to the charger based on the calculated value of the input voltage and a value of the power transmitted from the power transmitter;
    instructing, by the processor, the calculated input current to be input to the charger from the power transmitter; and
    instructing, by the processor, the battery of the vehicle to be charged based on the calculated value of the input voltage and the voltage value of the battery of the vehicle.

11. The fast charging method of claim 10, further comprising:
    re-calculating, by the processor, the input voltage and the input current and controlling the re-calculated input voltage and input current to be input to the charger, when the charged power is changed in a process in which the calculated input voltage and input current are input to the charger from the power transmitter to charge the battery of the vehicle.

* * * * *